No. 727,535. PATENTED MAY 5, 1903.
L. DENAYROUZE.
INCANDESCENT VAPOR BURNER.
APPLICATION FILED AUG. 8, 1900.
NO MODEL.
FIG. 1.
FIG. 2.
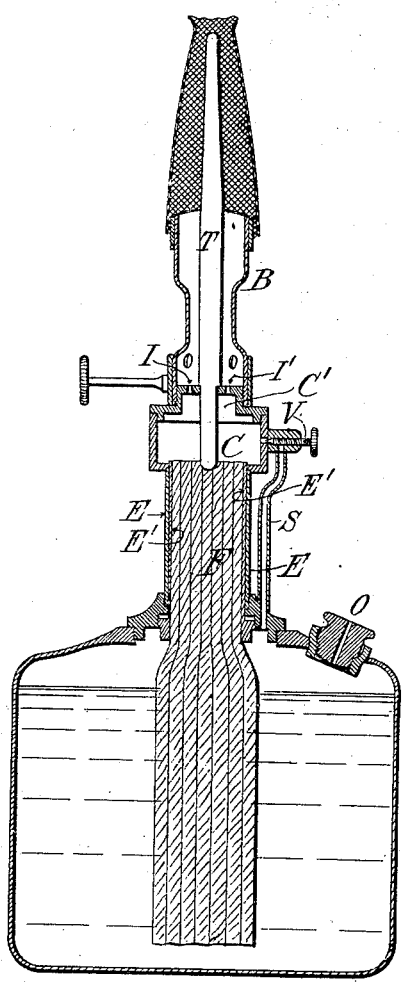
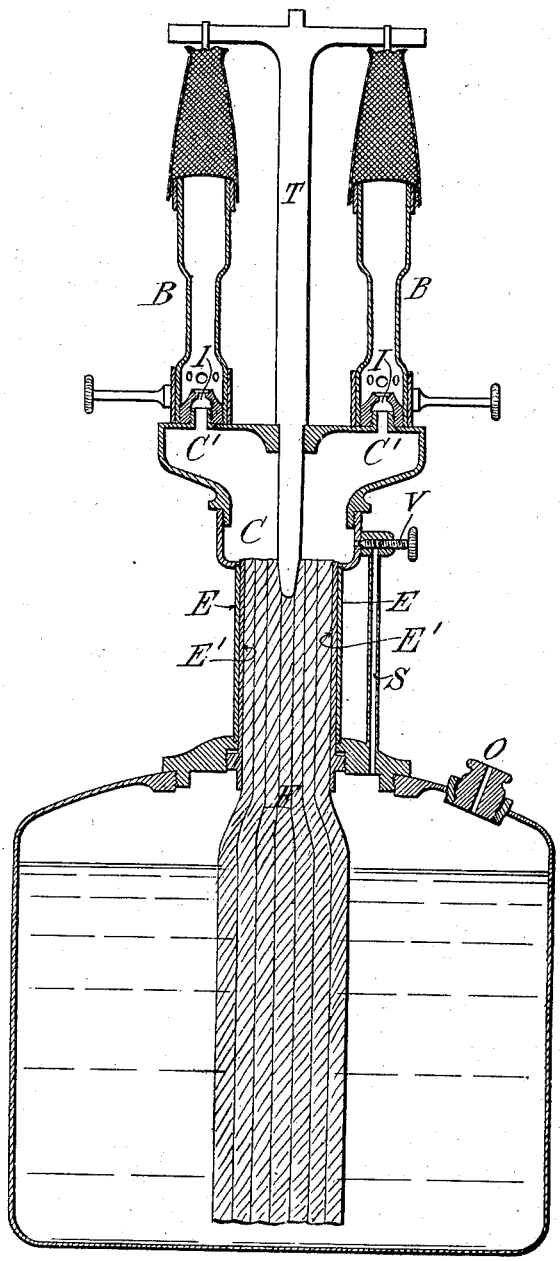

No. 727,535.

Patented May 5, 1903.

UNITED STATES PATENT OFFICE.

LOUIS DENAYROUZE, OF NEUILLY, FRANCE.

INCANDESCENT VAPOR-BURNER.

SPECIFICATION forming part of Letters Patent No. 727,535, dated May 5, 1903.

Application filed August 8, 1900. Serial No. 26,252. (No model.)

*To all whom it may concern:*

Be it known that I, LOUIS DENAYROUZE, engineer, a citizen of the Republic of France, residing at Neuilly, France, have invented Improvements in Incandescent Vapor-Lamps, of which the following is a specification.

This invention relates to lamps and aims to provide certain improvements therein especially applicable to lamps burning vapors of combustible liquid for incandescence.

It is common to employ lamps in which the liquid is supplied under pressure, and such lamps have the advantage that they give a strong light and are economical; but they require to be of very solid heavy construction and are somewhat complex in construction even when the pressure is obtained by utilizing the heat of the lamp.

The improvement hereinafter described which preserves the fundamental principle of the chamber of concentration of heat allows very satisfactory results to be attained with parts simple, light, and having the practical advantage that they allow the use of a burner suited for all the reservoirs of ordinary petroleum-lamps.

In the accompanying drawings, Figure 1 is a vertical axial section of a single-burner lamp provided with my improvements, and Fig. 2 is a similar view of a multiple-burner lamp provided with one form of my improvements.

In the new arrangement shown in Fig. 1 the burner B has passing through it a central rod T, which instead of descending into the reservoir of liquid passes only through the top C' of the chamber of concentrated heat for vaporizing. The lower end of this rod stops at the bottom of the chamber, entering only slightly into the bundle F of cotton wicks tightly squeezed in two covers E E' of insulating material or material of low conductivity, such as German silver. The first cover, E, is part of the lamp-body. The second, E', is simply a sheath of the wick. The vapors are injected through very small holes I, formed around the base of the central column. A small hole O forms a communication between the outer air and the reservoir of liquid.

The action is as follows: The liquid which strongly impregnates the tight wick F ascends by capillary attraction to the lower level of the chamber C without even accumulating as a layer on account of the resistance of the greatly-squeezed fibers to the ascent of the smallest drop of liquid. When the liquid reaches the chamber and it is heated by any known means of starting, abundant vapor is produced; but the moist wick on account of the adhesion of the strongly-squeezed filaments constitutes a sort of check-valve which can be penetrated from below upward by the liquid, but is impenetrable to the vapor, which cannot flow back in a direction opposite to the flow. Also the column, half solid, half liquid, and a very bad conductor, does not allow the heat to descend toward the reservoir and lose itself then, so that there is strong concentration of heat on the chamber perfectly maintained at this point. The consequence of this is that the vapor in the chamber has an elastic force sufficient to cause the jet which supplies the Bunsen burner I to acquire such velocity as to produce very fine incandescence, even while the liquid in the reservoir is subject only to atmospheric pressure. From this it results that the whole of this burner—that is to say, the burner proper and the wick with its double sheath—can be screwed on the reservoir of a petroleum-lamp of ordinary form. For extinguishing the lamp the pointed screw V is turned so as to put the vaporizing-chamber in communication with the top of the reservoir by a pipe S. The hot vapors expand from the chamber into the free space in the reservoir and then cool. Thus the extinction is simple and rapid.

Fig. 2 shows the same arrangement applied to a multiple burner, with a central conducting-rod in the center of the wicks.

Having thus described the nature of this invention and the best means I know for carrying the same into practical effect, I claim—

1. In an incandescence gas-burning lamp, the combination of a lamp-body, a vaporizing-chamber, a connection of German silver between said body and chamber retarding by reason of its low conductivity the transmission of heat to said body so as to localize and concentrate the heat at the vaporizing-chamber and thus increase the vaporizing efficiency of the lamp, and a wick leading from said body to said chamber and compressed to prevent backward passage of gas while drawing up liquid by capillarity from said body to said chamber, whereby vapor in the body of the lamp and pressure on the liquid are avoided.

2. In an incandescence gas-burning lamp, the combination of a lamp-body, a vaporizing-chamber C, a tube made of material of low conductivity forming a connection between said body and chamber retarding the transmission of heat to said body so as to localize and concentrate the heat at the vaporizing-chamber and thus increase the vaporizing efficiency of the lamp, and a wick F leading from said body to said chamber and compressed in said tube to prevent backward passage of gas while drawing up liquid by capillarity from said body to said chamber, whereby vapor and heat in the body of the lamp and pressure on the liquid are avoided, a Bunsen burner through which gas passes from said chamber, an incandescing mantle above said burner, and a rod T of conducting material adjacent at its upper portion to said mantle and passing at its lower end to the top of the wick in said chamber so as to transmit the heat from said mantle to the point of vaporization.

3. In an incandescence gas-burning lamp, the combination of a lamp-body, a vaporizing-chamber, a connecting-tube E composed of material of low conductivity between said body and chamber retarding the transmission of heat to said body so as to localize and concentrate the heat at the vaporizing-chamber and thus increase the vaporizing efficiency of the lamp, a wick comprising a bundle of fibrous material tightly squeezed into a sheath E' of the same material of low conductivity, said wick leading from said body to said chamber and the compression thereof acting to prevent backward passage of gas while drawing up liquid by capillarity from said body to said chamber, whereby vapor and heat in the body of the lamp and pressure on the liquid are avoided, a Bunsen burner receiving the gas from said chamber, an incandescing mantle above said Bunsen burner, a heat-conductor adjacent at its upper end to said mantle and at its lower end to the top of the wick so as to transmit the heat of said mantle to the vaporizing-point, and means for putting the vaporizing-chamber in communication with the reservoir to extinguish the lamp.

In witness whereof I have hereunto signed my name in the presence of two subscribing witnesses.

LOUIS DENAYROUZE.

Witnesses:
J. ALLISON BOWEN,
ALEXANDER MATHIEU.